United States Patent [19]

Hishinuma et al.

[11] 4,233,474
[45] Nov. 11, 1980

[54] TELEPHONE TRANSMITTER AMPLIFIER

[75] Inventors: Esao Hishinuma; Akinobu Tomimori; Hiroshi Hara, all of Tokyo, Japan

[73] Assignee: Nippon Electric Co., Ltd., Tokyo, Japan

[21] Appl. No.: 1,361

[22] Filed: Jan. 5, 1979

[30] Foreign Application Priority Data

Jan. 10, 1978 [JP] Japan .................................. 53-1757
Jan. 10, 1978 [JP] Japan .................................. 53-1758
Feb. 1, 1978 [JP] Japan .................................. 53-10957

[51] Int. Cl.³ .......................................... H04M 1/60
[52] U.S. Cl. .............................................. 179/81 B
[58] Field of Search ................ 179/81 R, 81 A, 81 B, 179/1 A, 1 HF, 16 F

[56] References Cited

U.S. PATENT DOCUMENTS 3,867,576 2/1975 Simonsen .......................... 179/81 B Primary Examiner—Bernard Konick
Assistant Examiner—Joseph A. Popele
Attorney, Agent, or Firm—Laff, Whitesel & Rockman

[57] ABSTRACT

A telephone transmitter amplifier circuit is easy to manufacture in integrated circuit form and has a low power consumption. It has a microphone unit, and an operational amplifier including a differential amplifer. A grounded collector transistor is connected to the output of the differential amplifier and a constant-current circuit is connected to the emitter of that transistor. An output stage amplifier has a grounded emitter transistor having its base connected directly to the output terminal of the operational amplifier. A smoothing circuit smooths the voltage which is supplied from the telephone line to the amplifier. A voltage-divider circuit, at the output of the smoothing circuit, presets the operating points of the operational amplifier and the output stage amplifier. The output terminals of the output stage amplifier are connected in common to input terminals of the smoothing circuit.

9 Claims, 8 Drawing Figures

LENGTH OF TELEPHONE LINE ⟶

TELEPHONE TRANSMITTER AMPLIFIER

The present invention relates to a telephone transmitter amplifier for use in a telephone subscriber set.

BACKGROUND OF THE INVENTION

Because of its long life and its small signal distortion, a telephone transmitter containing an amplifier is suitable for data communication in which a telephone transmitter is combined with an acoustic coupler. Therefore, transmitters with amplifiers have been finding an increasing use in displacing of the conventional carbon transmitter, as a result of the progress in data communication.

In the conventional telephone transmitter amplifiers, it is the practice to use Darlington circuits for the reduction of fluctuations in the D.C. resistance of the telephone transmitter, caused by the fluctuation in the D.C. current amplification factor. The transistors used in the Darlington connection usually are two silicon NPN transistors or the complementary Darlington connection of PNP and NPN transistors at the out put stage of the amplifier, as taught in ("Electronic Telephone Sets" By A, Boeryd, ERICSSON REVIEW, No. 1, pp. 2-12, 1974).

While the Darlington connection is suited for a low current operation and effective for the suppression of D. C. resistance fluctuation the minimum ON voltage Von is high. When used in a parallel connection with the low-resistance telephone set, however, the voltage across the telephone transmitter is lowered, thereby unavoidably lowering the maximum distortionless output. More particularly, with the voltage across a telephone transmitter represented by $E_T$, the maximum distortionless output in peak-to-peak value is represented by 2 ($E_T$-Von). Therefore, if the voltage $E_T$ is reduced to about 1 V and the voltage Von is assumed to be 0.7 V, the maximum distortionless output is lowered to 0.6 V in peak-to-peak value.

In addition, the reduction in the supply voltage across the telephone transmitter results in the decrease in the arriving signal level at a telephone exchange. To avoid this, it has been proposed to connect a field effect transistor for adjusting the output level on the input side of the preamplifier (Reference is made to "An Integrated Speech Circuit" (in Japanese) by M. Terai, et al, ELECTRICAL COMMUNICATION LABORATORIES TECHNICAL JOURNAL, Vol. 22, No. 2, pp. 261-284, 1973). However, this approach has a disadvantage in that the differences in the threshold voltage from one field effect transistor to another requires a fine adjustment for each transistor, thereby complicating the process of manufacturing such a telephone transmitter amplifier in an integrated circuit form.

It is therefore an object of the present invention to provide a telephone transmitter amplifier capable of providing a high maximum distortionless output voltage even with a lowered supply voltage from the telephone line and of maintaining a constant gain even at a low current level.

Another object of the present invention is to provide a telephone transmitter amplifier having an automatically controlled output level.

Still another object of the present invention is to provide a telephone transmitter amplifier of minimized power consumption.

Further object of the present invention is to provide a telephone transmitter amplifier suited for manufacture in an integrated circuit form.

SUMMARY OF INVENTION

According to the present invention, a telephone transmitter amplifier comprises a microphone unit, an operational amplifier including a differential amplifier, and a grounded collector PNP (or NPN) transistor connected to the output terminal of the differential amplifier. A constant-current circuit is connected to the emitter of the PNP (or NPN) transistor. An output stage amplifier is composed of a grounded emitter NPN (or PNP) transistor having the base of the NPN transistor directly connected to the output terminal of the operational amplifier. A smoothing circuit is provided for smoothing the voltage received from the telephone line. A voltage-divider circuit divides the output voltage of the smoothing circuit to preset the operating voltage of the operational amplifier. The output terminals of the output stage amplifier are connected in common to input terminals of the smoothing circuit.

BRIEF DESCRIPTION OF THE DRAWING

The above-mentioned and other features and objects of the present invention will become more apparent by reference to the following description of its preferred embodiments taken in conjunction with the accompanying drawings, wherein.

DESCRIPTION OF PREFERRED EMBODIMENTS

Figure 1:
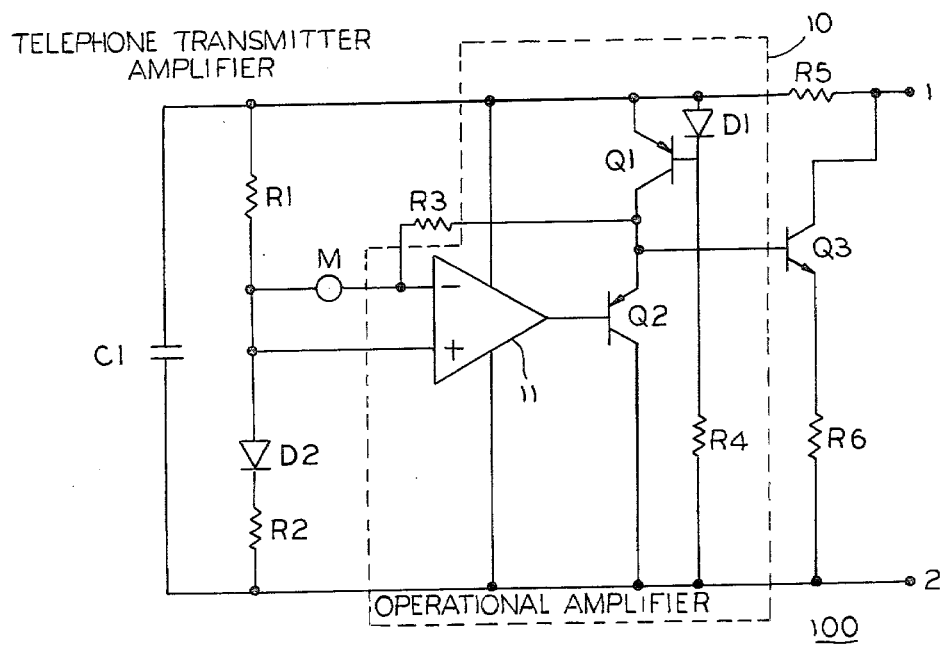
FIG. 1 is a circuit diagram of a first embodiment of the present invention.

In FIG. 1, a telephone transmitter amplifier 100 is composed of an operational amplifier 10, a resistor R3 for setting the gain of the operational amplifier 10, an NPN transistor Q3 of the grounded emitter configuration for the output stage, and a resistor R6 for setting the gain of transistor Q3. An input voltage divider includes a resistor R1, a diode D2 and a resistor R3 for setting the operating voltage of the operational amplifier 10. A smoothing circuit includes a resistor R5 which also serves as the effective output impedance of the transmitter 100 and a capacitor C1 for smoothing the voltage supplied from a telephone line.

The operational amplifier 10 has an amplifier section composed of a differential amplifier 11 and a PNP transistor Q2 of the grounded collector configuration. A constant-current circuit is composed of a PNP transistor Q1, a diode D1 and a resistor R4.

An audio frequency signal is supplied from a microphone M connected across the input terminals of the operational amplifier 10 and is amplified by a factor of R3/Rm, by means of the differential amplifier 11 and the grounded collector transistor Q2, where Rm represents an internal resistance of the microphone M. Then, the amplified audio signal is applied to the base of the grounded transistor Q3. When the emitter operating resistance of the emitter of transistor Q3 is represented by Re and the impedance of the telephone set circuit (including the telephone line as viewed from terminals 1 and 2) is represented by $R_l$, the amplification factor of the output stage transistor Q3 is given by R5 $R_l/\{/[(R_l+R5)(R6+Re)]\}$. The emitter operating resistance Re is varied in inverse proportion to the emitter current. However, if the resistance R6 satisfies the condition where R6>>Re, the gain at the output stage can be kept substantially constant even when the voltage between the terminals 1 and 2 varies. Since the gain of the operational amplifier 10, serving as a preamplifier is constant, the gain of the telephone transmitter can be maintained substantially constant regardless of where the telephone transmitter is installed.

The transistor Q1, forming the constant-current circuit, provides through its collector a constant current that is proportional to the current flowing through the series connection of the diode D1 and the resistor R4. The collector of the transistor Q1, the emitter of the transistor Q2 and the base of the transistor Q3 are connected in common. There are fluctuations in the base current of the transistor Q3 which are caused by the fluctuation in its D. C. current amplification factor. The variation of the emitter current of the grounded collector transistor Q2 can compensate for these fluctuations. Accordingly, no fluctuation occurs in the D. C. voltage drop across the resistor R5, so that the voltage across the capacitor C1 and the voltage between the terminals 1 and 2 are kept constant regardless of the fluctuation in the D. C. current amplification factor of the transistor Q3. The voltage across the capacitor C1 determines the operating voltage of the operational amplifier 10 as divided by the resistors R1 and R2 and the diode D2. Since the voltage across the capacitor C1 is constant, the operating voltage is not varied. In other words, the D. C. characteristics of the amplifier can be determined by the selection of the resistors R1 and R2 and the diode D2. Thus the influence of the D. C. current amplification factor of the transistor Q3 can be neglected.

According to the present invention, different types of bipolar transistors are directly connected, that is, the PNP transistor Q2 and the NPN transistor Q3. The circuit can be actuated with only the base-emitter rising voltage for a single transistor. Since this rising voltage is fed from the opposite terminals of the capacitor C1, even if the voltage between the output terminals should be temporarily reduced, the amplification characteristics does not deteriorate.

Accordingly, the minimum ON voltage $V_{ON}$ of the transistor Q3 can be lowered to about 0.2 V, so that the maximum distortionless output voltage Vp−p becomes 2 ($E_V$−0.2) V. Thus, even if the voltage across the telephone transmitter $E_V$ is 1 V, a maximum distortionless output voltage of 1.6 V in peak-to-peak value can be obtained.

Figure 2:
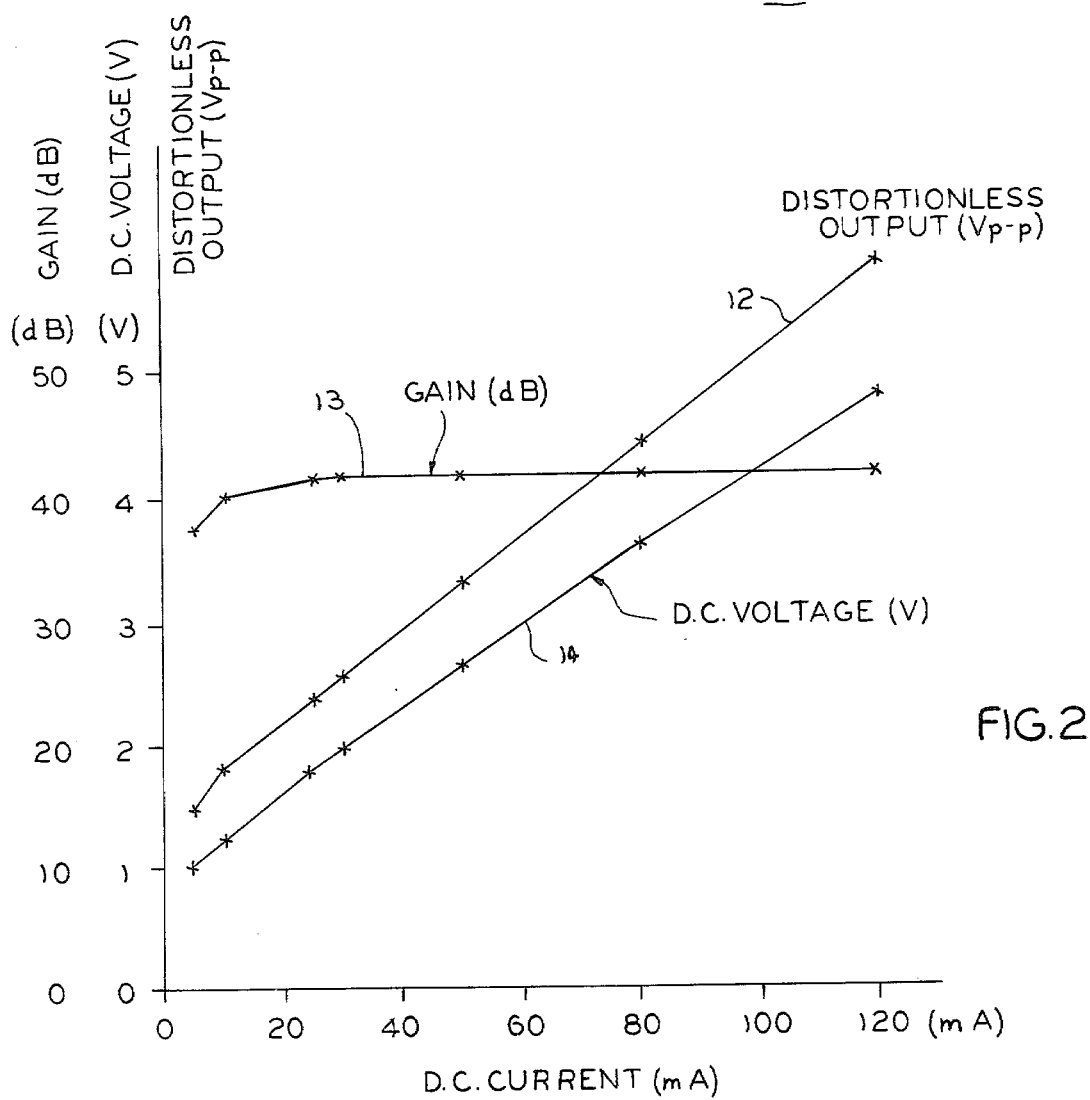
FIG. 2 shows characteristics of the embodiment of FIG. 1.

In one example, the ratio of the resistances R1 and R2 was set at 2:1, the resistance of the resistor R5 was 270 ohms, the resistance R6 was 10 ohms, the capacitance of the capacitor C1 was 22 microfarads. The resistance R4 had a resistance value such that the resistor R4 could pass a current through the collector of the transistor Q1 which is twice as large as the base current during the worst case condition, when the transistor Q3 having the lowest D.C. current amplification factor was employed to manufacture the amplifier. To such a telephone transmitter amplifier are connected, as an A.C. load, a resistor of 120 ohms, with the connection being via a capacitor between the telephone transmitter terminals 1 and 2 (not shown). A D.C. voltage source is connected via a D.C. feeding coil between the terminals 1 and 2. A D.C. current flowing through the transmitter and a D.C. voltage drop thereacross were measured. The results of measurement are shown in the diagram in FIG. 2. In this figure, curves 12 and 13 indicate a maximum distortionless output and a gain, respectively, when a signal of 1500 Hz was applied to the microphone. As will be seen from this diagram, a maximum distortionless voltage of 1.5 V in peak-to-peak value can be obtained at a D.C. current of 5 mA and a D.C. voltage of 1 V. Also it is seen that even for a lower current and voltage level, the gain is kept substantially constant as it is for high current and voltage level.

Figure 3:
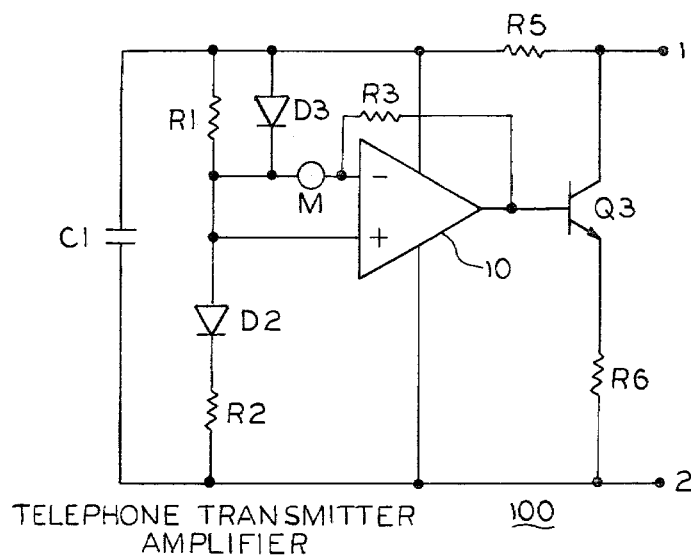
FIG. 3 is a circuit diagram of a second embodiment of the present invention.

With reference to FIG. 3, a telephone transmitter amplifier 100 is identical to that shown in FIG. 1 except that a diode D3 is connected in parallel with the resistor R1. For convenience of representation, the operational amplifier 10 is indicated in a simplified form, but it is composed of exactly the same circuit as is used in the operational amplifier 10 in FIG. 1. This telephone transmitter amplifier has the same features and advantages as those described with reference to FIG. 1. In addition, it has an advantage that, even if the telephone set is installed close to an exchange, undesirable power consumption can be avoided. Furthermore, when manufactured in an integrated circuit form, the telephone transmitter amplifier helps miniturize the chip itself and the IC package. More specification, the voltage $V_{1,2}$ between the terminals 1 and 2, in the absence of the diode D3(equal to the terminal voltage in the first embodiment in FIG. 1), is given by the following equation, with the D.C. current represented by I and with the voltage drop across the diode D2 assumed to be 0.7 V, and with the current flowing into the operational amplifier neglected:

$$V_{1,2}=R6(1+(R1+R5)/R2)I+0.7 \text{ (volts)} \qquad (1)$$

In contrast, in the circuit shown in FIG. 3 with the diode D3, when a voltage high enough to make the diode D3 conductive is supplied, the corresponding terminal voltage $V'_{1,2}$ is given by the following equation:

$$V'_{1,2} = R6(1+\frac{R5}{R2})I + 1.4 \text{ (volts)} \qquad (2)$$

Comparing Equations (1) and (2), the difference ΔV given by:

$$\Delta V = V'_{1,2} - V_{1,2} = R6\frac{R1}{R2} - 0.7 \text{ (volts)} \qquad (3)$$

Figure 4:
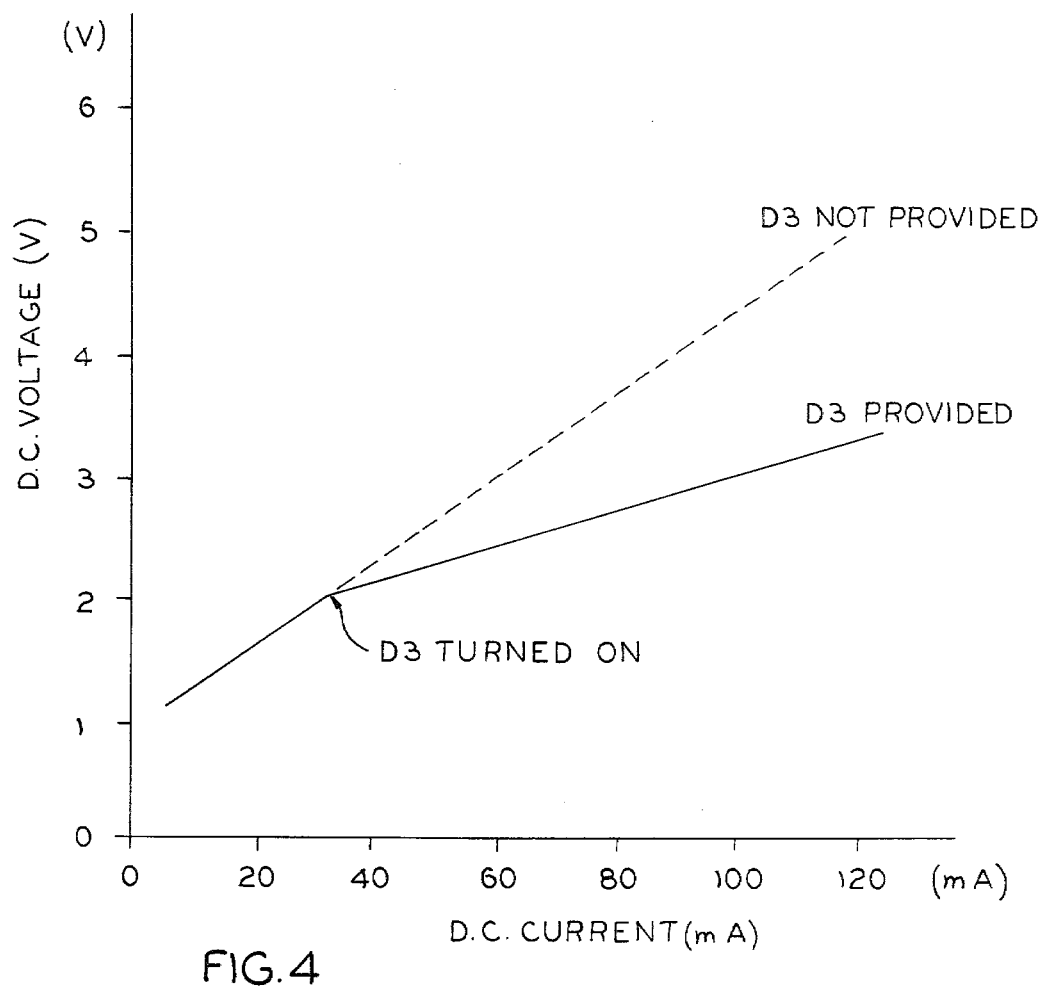
FIG. 4 shows characteristics of the second embodiment shown in FIG. 3.

Thus after the diode D3 has become conductive, the terminal voltage $V'_{12}$ represented by Equation (2) becomes smaller, reducing the electric power consumption. Even if the diode D3 is provided, the terminal voltage is given by Equation (1) for such region where the diode is non-conductive. Therefore, the D.C. voltage vs D.C. current characteristic of the telephone transmitter amplifier is represented by the solid line in FIG. 4. The dotted line in this figure represents the characteristics of the first embodiment (FIG. 1), which does not have the diode D3. Accordingly, when the telephone set is installed close to an exchange, the power consumption can be reduced. This is advantagous for producing the amplifier in an integrated circuit form.

Figure 5:
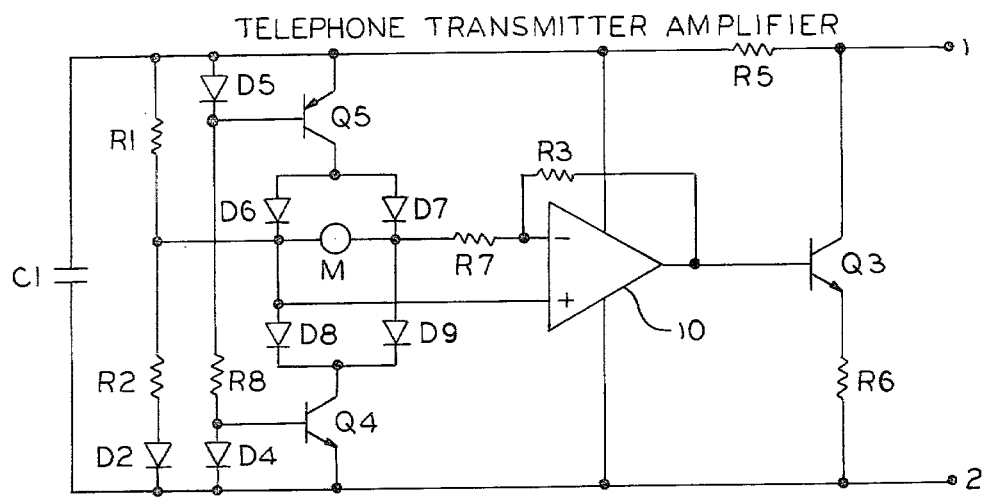
FIG. 5 is a circuit diagram of a third embodiment of the present invention.

FIG. 5 shows that the third embodiment of the invention is different from that shown in FIG. 1 in that a variable impedance alternating current shunt is connected in parallel with the microphone unit M. The a-c shunt includes a parallel combination of a first diode series string of diodes D6 and D8 and a second diode series string of diodes D7 and D9. The diodes D6 to D9 have identical characteristics. The junctions of the diodes D6 and D8 and diodes D7 and D9 are connected to the respective terminals of the microphone unit. The anode of the diode string is connected to the collector of transistor Q5, while the cathode of the diode string is connected to the collector of transistor Q4. A pair of the transistors Q5 and Q4 constitute a pair of flow-in type and flow-out type constant current circuits with a series combination of diode D5, resistor R8 and diode D4. The bases of the transistor Q5 and Q4 are connected to the junctions of the diode D5 and resistor R8 and the diode D4 and resistor R8, respectively. A current flowing therethrough is determined by a resistor R8 and the voltage of the capacitor C1. A resistor R7 is connected between the microphone M and the operational amplifier 10.

In this telephone transmitter amplifier, the variable impedance alternating current shunt connected in parallel to the microphone M terminates the microphone. The output signal of the microphone M may be varied automatically in accordance with the feeding voltage between the terminals 1 and 2. Therefore, the input signal to the operational amplifier 10 is automatically varied to adjust the output signal level of the telephone transmitter amplifier.

If the voltage across the capacitor C1 is high enough to turn ON the diodes D4 and D5, then a current determined by the resistor R8 flows through these two diodes D4 and D5. Likewise, through the transistors Q4 and Q5 flows a current determined by the current flowing through the resistor R8, as collector currents of these transistors. Accordingly, through the diodes D6 to D7 also flow currents which are proportional to the collector current. The impedance of the transistors Q4 and Q5, as viewed from the diode bridge (D6-D9) towards the collector sides of these transistors, is nearly infinite. Therefore, the composite differential resistance $R_G$ of the a-c shunt is represented by the following equation, where Ic represents the collector current:

$$R_G = 2kT/qI_c \qquad (4)$$

In the above equation, k represents a Boltzmann's Constant, T represents an absolute temperature and q represents the electric charge of an electron. The output resistance of the microphone M is represented by $R_M$ and output voltage of the microphone M by $V_M$. The input signal $V_S$ to the operational amplifier 10 is represented by the following equation:

$$V_S = V_M R_G/(R_M + R_G) \qquad (5)$$

Substituting Equation (4) and rearranging, the following equation is obtained:

$$V_S = V_M/(1 + \frac{qR_M}{2kT} \cdot Ic) \qquad (6)$$

The input signal $V_S$ to the operational amplifier 10 is reduced with the increase in the collector current Ic or, in other words, with the decrease in the distance of the telephone set from the telephone exchange. The input signal level applied to the operational amplifier 10 is reduced even if the loudness level at to the microphone M remains unchanged. On the other hand, the composite output resistance $R_T$ of the microphone M is equal to a parallel resistance value of $R_M$ and $R_G$. The amplification degree of the operational amplifier 10 is represented by $R3/(R7+R_T)$. If the resistance of the resistor R7 is selected so as to satisfy the relation of $R7>>R_T$, then the amplification factor of the operational amplifier becomes constant. Accordingly, as the telephone set is installed close to the telephone exchange, the output signal level of the telephone transmitter amplifier is lowered. Taking it into consideration that the loss due to a telephone line is reduced as the length of the line becomes shorter, an arriving signal level at the exchange is kept constant regardless of the length of the telephone line so long as the line length falls within a given range. However, even though the two diodes D4 and D5 are in a conductive state, only the diodes D8 and D9 are conductive if the voltage drop across the resistor R1 in the voltage-divider circuit does not reach the triggering voltage of the diodes D6 and D7. In that event, the diodes D6 and D7 remain non-conductive, so that the operating voltages of the operational amplifier 10 and the transistor Q3 of the output stage amplifier are varied, lowering the arriving signal level.

In the above-described embodiment, the control is effected at a low signal range of the operational amplifier. The nonlinearity of the a-c shunt consisting of the diodes D6 to D9 is not therefore significant. Since the feeding current of the transistors Q4 and Q5 in the constant-current source is controlled by the voltage on the capacitor C1, the dependency of the operating resistance variation of the a-c shunt D6-D9 upon the output level variation between the large and small input signals to the microphone M, is small. Thus a telephone transmitter amplifier having distortionless automatic output control capability can be obtained.

In addition, when manufactured in an integrated circuit form, this telephone transmitter amplifier facilitates the presetting of the rising voltages because there is a smaller difference in the operating points of the transistors Q4 and Q5. The post-manufacture adjustment for the presetting becomes unnecessary. In addition, since only one capacitor is used, the amplifier is less costly to manufacture and has higher reliability. Furthermore, for manufacture of the amplifier in an integrated circuit form, the conventional process of manufacturing bipolar IC's is sufficient.

Figure 6:
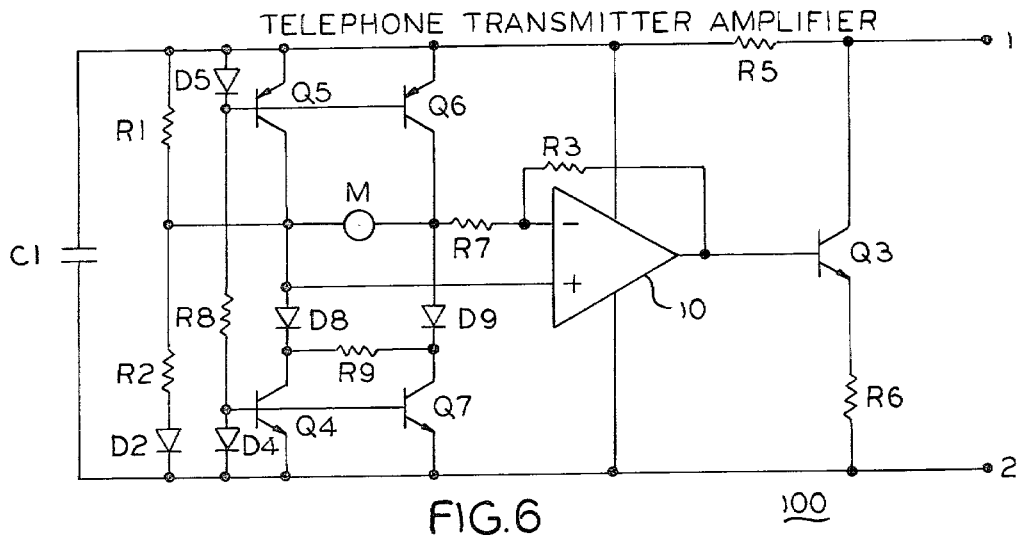
FIG. 6 is a circuit diagram of a fourth embodiment of the present invention.

Another embodiment shown in FIG. 6 has an improvement over that shown in FIG. 5 such that the range of automatic signal level control is broadened. The microphone unit is connected in parallel to the variable impedance alternating current shunt formed by a combination of a series connection of a diode D8, resistor R9 and a diode D9. The anode and cathode of diode D8 are connected to the collectors of transistors Q5 and Q4, respectively, while the anode and cathode of the diode D9 are connected between the collectors of transistors Q6 and Q7.

Figure 7B:
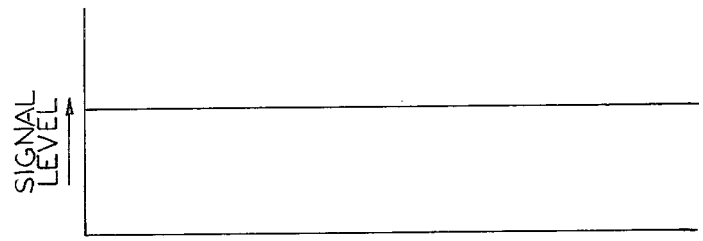
FIG. 7b shows an arriving signal level, in the fourth preferred embodiment of FIG. 6.
Figure 7A:
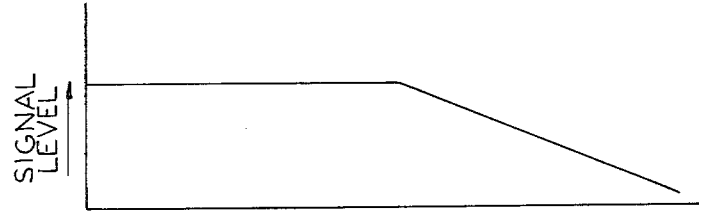
FIG. 7a shows an arriving signal level, in the third preferred embodiment of FIG. 5.

In this modified embodiment, it is only necessary to make the diodes D8 and D9 conductive. Therefore, if the voltage across the capacitor C1 exceeds the voltage needed for the diodes D4 and D5 to become conductive, the signal level arriving at the exchange can be controlled automatically as shown in FIG. 7(b).

It is to be noted that in this modified embodiment, the composite output resistance of the microphone M is equal to the resistance of the parallel connection of internal resistance $R_M$ of the microphone M and a series resistance consisting of a differential resistance of the diode D8, resistance R9 and a differential resistance of the diode D9 connected in series. Also, as in the case of the circuit shown in FIG. 5, the increase in the current flowing through the constant-current circuit results in the reduction in the input signal $V_S$ to the operational amplifier. Also, while the diode terminals are directly connected to the microphone M in the circuits shown in FIGS. 5 and 6, the diode terminals can be connected through resistors to the microphone M.

The embodiments shown in FIGS. 5 and 6 have the attenuation of the microphone output signal, made variable by means of an a-c shunt or analog switch to vary the input signal level to the operational amplifier thereby to automatically control the gain. The circuit can be modified in such a manner that the a-c shunt or analog switch is connected in parallel to the resistor R3. With this resistor associated with the a-c shunt or analog switch connected to a constant-current circuit which can pass a constant current depending upon the voltage across the capacitor C1, there is an automatically controlled the gain of the operational amplifier itself.

While the operational amplifiers employed in the embodiments described are of inverted type, they may be of non-inverted type.

What is claimed is:

1. A telephone transmitter amplifier comprising a microphone means, an operational amplifier means including a differential amplifier, said microphone means being coupled to an input of said differential amplifier, a grounded collector PNP (or NPN) transistor connected to the output terminal of said differential amplifier and a first constant-current circuit means connected to the emitter of said PNP (or NPN) transistor, an output stage amplifier including a grounded emitter NPN (or PNP) transistor circuit having its base directly connected to the output terminal of said operational amplifier, a smoothing circuit means for smoothing a voltage supplied from a telephone line, and a voltage-divider circuit means for dividing the output voltage of said smoothing circuit to establish preset operating points for said operational amplifier and said output stage amplifier, output terminals of said output stage amplifier being connected in common to input terminals of said smoothing circuit means.

2. A telephone transmitter amplifier as claimed in claim 1, in which said voltage-divider circuit includes a nonlinear element for suppressing a rise of a D.C. voltage across said microphone means when a D.C. current supplied from said telephone line increases.

3. A telephone transmitter amplifier as claimed in claim 2, in which said nonlinear element is a diode connected in parallel to a voltage-dividing resistance in said voltage-divider circuit.

4. A telephone transmitter amplifier as claimed in claim 1, 2 or 3, further comprising a variable impedance alternating current shunt means connected in parallel with said microphone means, the impedance of the shunt being controlled by an output voltage of said smoothing circuit means.

5. A telephone transmitter amplifier as claimed in claim 4, in which said alternating current shunt means includes a second constant-current circuit means for providing said alternating current shunt with a constant current value responsive to the varying output voltage of said smoothing circuit.

6. A telephone transmitter amplifier as claimed in claim 5, in which said second constant-current circuit means includes a current flow-out type constant-current circuit and a current flow-in type constant-current circuit into which the output current of the former constant-current circuit flows, said alternating shunt means including a bridge circuit comprising two series circuits of two forwardly poled diodes connected in parallel to each other, and one pair of terminals at opposite ends of said two series being connected respectively to one pair of said constant-current circuits.

7. A telephone transmitter amplifier as claimed in claim 6, in which another pair of terminals at the center of said two series of diodes are connected to opposite terminals of said microphone unit.

8. A telephone transmitter amplifier as claimed in claim 5, in which said second constant-current circuit means includes two pairs of current flow-in type and current flow-out type constant-current circuits, and said alternating current shunt means including a series connection of a first diode connected in series in the forward direction between a pair of said current flow-in type and current flow-out type constant-current circuits, a second diode connected in series in the forward direction between another pair of said current flow-in type and current flow-out type constant-current circuits and a resistor connected between cathode terminals or anode terminals of said first and second diodes.

9. A telephone transmitter amplifier as claimed in claim 8, in which a pair of anode terminals or a pair of cathode terminals of said first and second diodes are connected to the opposite terminals of said microphone unit.

* * * * *

UNITED STATES PATENT AND TRADEMARK OFFICE
CERTIFICATE OF CORRECTION

PATENT NO. : 4,233,474
DATED : November 11, 1980
INVENTOR(S) : ESAO HISHINUMA, AKINOBU TOMIMORI and HIROSHI HARA It is certified that error appears in the above-identified patent and that said Letters Patent are hereby corrected as shown below:

Col. 3, Line 11,

Delete "$R_\ell/\{/[(R_\ell+R5)\ (R6+Re)]$."

should be --$R_\ell/\{(R_\ell+R5)\ (R6+Re)\}$.--

Col. 4, Line 35,

"Specification" should be --specifically--

Col. 6, Line 11,

After "at" delete --to--

Col. 7, Line 35, after "Controlled" delete "the".

Signed and Sealed this

Twenty-eighth Day of April 1981

[SEAL]

Attest:

RENE D. TEGTMEYER

Attesting Officer      Acting Commissioner of Patents and Trademarks